June 21, 1949.                N. F. HOSFORD                2,473,586
                 CABIN ALTITUDE AND OXYGEN USE INDICATOR
                          Filed April 13, 1948
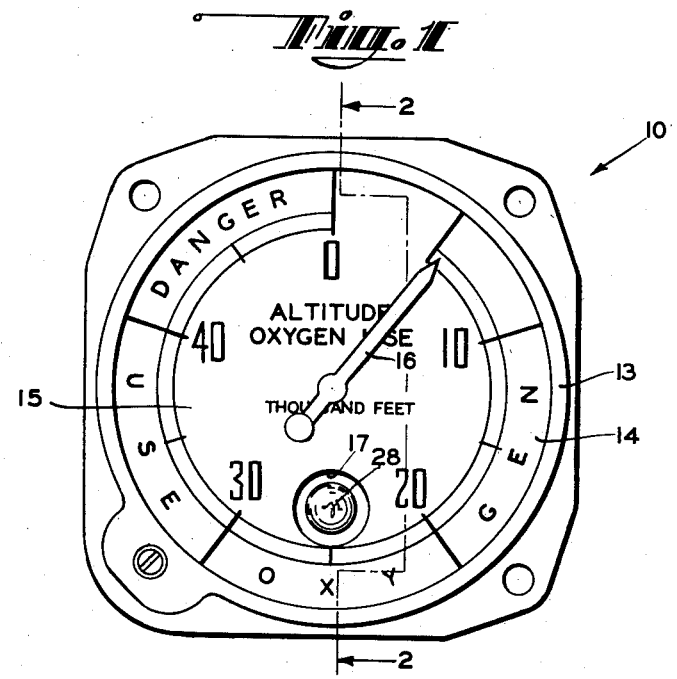
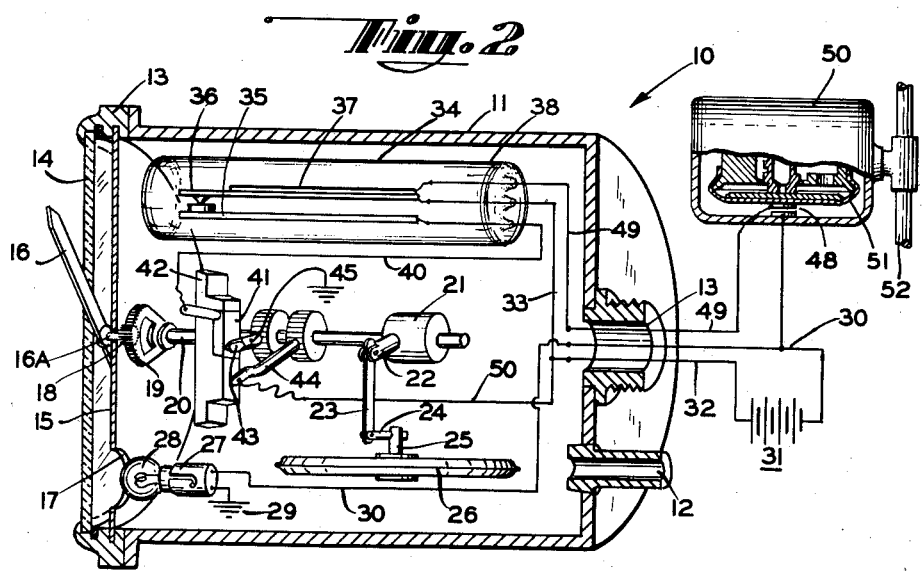
INVENTOR.
NORMAN F. HOSFORD
BY
ATTORNEY Patented June 21, 1949

2,473,586

UNITED STATES PATENT OFFICE 2,473,586

CABIN ALTITUDE AND OXYGEN USE INDICATOR

Norman F. Hosford, Towaco, N. J., assignor to Bendix Aviation Corporation, Teterboro, N. J., a corporation of Delaware Application April 13, 1948, Serial No. 20,783

10 Claims. (Cl. 177—311)

1

This invention relates to an altitude indicator, and more particularly to a cabin altitude and oxygen use indicator for aircraft.

It is an object of my invention to provide an indicator or warning unit to indicate the need for oxygen in a high flying aircraft when the ambient pressure of the cabin falls to a predetermined level.

Another object of my present invention is to provide an indicator of the character indicated in which the warning or signal given at the predetermined altitude is extinguished upon supplying the required oxygen to the aircraft cabin.

Still another object of this invention is to provide an indicator of the character indicated in which the warning or signal is again given upon a decrease in cabin pressure below a second predetermined level.

Yet another object of my invention is to provide an indicator of the general character described in which the warning or signal indication is operative by the cabin pressure and made inoperative upon the operation of an oxygen regulator normally forming a part of the equipment carried by high flying aircraft and/or personnel.

A further object of this invention is to provide an indicator of the general character described in which the failure of the oxygen regulator equipment between prescribed pressure limits is indicated by my instrument.

Still a further object of my invention is to provide an indicator of the general character described which shall consist of few and simple parts, relatively inexpensive to manufacture, which shall be positive and accurate in its operation, and yet be practical and efficient to a high degree in use.

Other objects of this invention will in part be obvious and in part hereinafter pointed out.

In the accompanying drawings forming a part of this specification in which one of the various possible illustrative embodiments of this invention is shown, and wherein similar reference characters designate corresponding parts throughout the two views, Fig. 1 is a front elevational view of an instrument incorporating my invention, while Fig. 2 is a perspective view taken approximately along the line 2—2 of Fig. 1, portions thereof being shown in cross-section; the parts thereof being shown electrically connected to form a schematic wiring diagram.

In the drawings, the numeral 10 designates an instrument embodying my invention, enclosed in a casing 11 provided with two openings 12 and

2

13 in the rear thereof. The front of the casing is closed by means of a bezel ring 13 and a cover glass 14 through which a dial 15 and a cooperating pointer 16 may be viewed. For purposes hereinafter appearing, the dial 15 is provided with a small aperture 17 in the lower portion thereof.

The pointer 16 is fixed to a shaft 16a journalled through the center of the dial 15. A pinion 18 is fixed to the rear end of the shaft 16a and is adapted to be rotated by a sector gear 19 meshing therewith. The sector gear 19 is fixed to the end of a horizontal shaft 20 suitably journalled within the casing 11. Fixed to the other end of the shaft 20 is a collar 21 provided with a radially extending arm 22. Pivoted to the end of said arm is a link 23 interconnecting an arm 24 fixed in a stud 25 of an aneroid 26.

The aperture 12 provided in the casing 11 will permit the ambient pressure of the instrument to affect the aneroid 26. The expansion and contraction of the aneroid due to the varying ambient pressure will shift the link 23 to rotate the shaft 20 by way of the arm 22. The rotation of the shaft 20 will in turn cause a rotation of the pinion 18, thereby moving the pointer 16 over the dial 15 of the instrument. A reading of the pointer and dial will thus give an indication of the ambient pressure affecting the instrument in terms of altitude. This ambient pressure may be either barometric pressure or it may be the pressure within a sealed cabin of an aircraft.

Means is now provided to indicate the ambient pressure at which oxygen is required by the pilot and/or passengers, the pressure being equivalent to that found at an altitude of 10,000 feet.

To this end there is provided an electrical lamp socket 27 suitably mounted within the instrument casing 11 and directly behind the aperture 17 provided in the dial 15. A small electrical light lamp 28 is provided for the socket 27 and may extend slightly beyond the dial 15. One terminal of the lamp socket 27 is grounded as at 29, while the other terminal is connected by a wire 30 through the aperture 13, in reality a socket and plug connector, to the negative side of a battery 31. The positive side of the battery 31 is connected via leads 32 and 33 to one terminal of a thermal responsive switch 34.

The thermal switch 34 comprises two switch arms 35 and 36 provided with suitable end contacts normally closed. The switch arm 36 is further provided with a heater strip 37 in intimate contact therewith. The two contact arms are inclosed in a glass envelope 38 suitably mounted within the casing 11.

The positive lead 33 is connected to the switch arm 36 while the switch arm 35 is connected by a lead 40 to a conducting insert 41 in an insulated block 42 fixed within the casing. Integral with the shaft 20 are two radially extending contact arms 43 and 44. The two contact arms are electrically insulated from one another and are adapted to be moved across the face of the insulating block 42 to engage the conducting insert 41 therein. The two arms are angularly displaced from one the other by an amount equivalent to the different pressures set into the instrument. Both arms, however, are adapted upon rotation of the shaft 20 a suitable degree, to engage the conducting insert 41 sequentially and then concurrently. In the description to be hereinafter made, the contact arm 43 will be referred to as the low altitude contact, while the contact arm 44 will be referred to as the high altitude contact.

The low altitude contact 43 is grounded as indicated at 45. When the contact arm 43 engages the conducting insert 41 of the block 42, a circuit will be completed for the electric light 28 to provide a visual indication that a particular ambient pressure exists. The engagement of the low altitude contact 43 with the insert 41 will ground the positive side of the battery 31, the circuit being traced from the ground 45 through contact arm 43 and insert 41, the wire 40, the normally closed switch arms 35 and 36 and the positive leads 33 and 32. The lamp 28 will thus be lighted to indicate to the pilot that oxygen must be supplied to permit continued safe flight.

When the oxygen supply is turned on, the flow of oxygen through an oxygen regulator such as shown in the copending applications of B. B. Holmes bearing Serial No. 482,016 and Serial No. 569,777 filed, respectively, on April 6, 1943 and December 26, 1944 will operate a blinker signal. A switch 48 of a blinker signal 50 is operated by the movement of the diaphragm 51 therein as the oxygen passes through the supply line 52 of the oxygen regulator (not shown). The operation of the blinker switch provides an electric circuit for the heater element 37 on the switch arm 36. This circuit may be traced from the negative side of the battery 31 through the blinker switch contacts and a lead 49 connected to the heater element 37, then by way of switch arm 36 and leads 33, 32 to the positive side of the battery 31.

The heater element 37 will become heated and due to its intimate contact with the switch arm 36, will flex the switch arm to an open position. The opening of the switch 35, 36 will open the energizing circuit for the lamp 28.

So long as the blinker switch 48 is operated by the flow of oxygen through the regulator, the heater element 37 will be intermittently connected into the circuit described to maintain the switch arm 35 and 36 in an open position. Should the regulator fail for any reason, a twenty or thirty second delay will permit the heater element to cool sufficiently to permit the switch 35, 36 to close again to complete the energizing circuit described for the lamp.

Means is now provided to indicate a second ambient pressure at which the oxygen supply is insufficient to maintain comfortable flight in view of the further decrease in the ambient pressure, the second predetermined pressure being equivalent to an altitude of 40,000 feet.

To this end, the high altitude switch contact 44 is provided. The contact 44 is connected by a lead 50 to the positive terminal lead 32. When the second pressure condition is attained, the contact 44 will engage the conducting insert 41 of the block 42. The low altitude contact 43 also engages the insert 41. Despite the open conditions of the switch 35, 36 due to the operation of the blinker switch 48, the engagement of the contact 44 with the insert 41 will ground the positive side of the battery 31 through the grounded contact 43 to complete a second energizing circuit for the lamp 28.

There is thus provided by my invention a pressure indicator in which a signal will be given when a proscribed ambient pressure exists where oxygen is required for safe air travel, the signal being extinguished upon operation of an oxygen regulator. A second indication is also provided by my instrument to indicate a pressure at which the oxygen supplied is insufficient for maintaining safe flight at that pressure.

As various possible embodiments may be made in the above invention, and as various changes may be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An oxygen requirement indicator for use with an oxygen regulator, comprising a pressure responsive member subjected to the ambient pressure of an aircraft cabin, a dial, a pointer cooperating with said dial and driven by said member to indicate the cabin pressure, a switch operable by said member when the cabin pressure reaches a predetermined value, a warning signal operable upon operation of said switch, and means associated with the oxygen regulator to extinguish said signal when oxygen flows through the regulator.

2. An oxygen requirement indicator for use with an oxygen regulator, comprising a pressure responsive member subjected to the ambient pressure of an aircraft cabin, a dial, a pointer cooperating with said dial and driven by said member to indicate cabin pressure, a switch operable by said member when the cabin pressure reaches a predetermined value, a warning signal operable upon operation of said switch, a blinker switch intermittently operable by the flow of oxygen through the regulator to extinguish said signal, and a second switch operable at a lower predetermined pressure by said member to operate said warning signal despite the operation of said blinker switch.

3. An oxygen requirement indicator for use with an oxygen regulator, comprising an aneroid subjected to the ambient pressure of an aircraft cabin, a dial, a pointer cooperating with said dial and driven by said aneroid to indicate cabin pressure, a switch operable by said aneroid when the cabin pressure reaches a predetermined value, a warning signal operable upon operation of said switch, a blinker switch intermittently operable by the flow of oxygen through the regulator, and a time delay switch operable by the operation of said blinker switch to extinguish said signal.

4. An oxygen requirement indicator for use with an oxygen regulator, comprising an aneroid subjected to the ambient pressure of an aircraft cabin, a dial, a pointer cooperating with said dial and driven by said aneroid to indicate cabin pressure, a switch operable by said aneroid when the cabin pressure reaches a predetermined value, a warning signal operable upon operation of said switch, a blinker switch intermittently operable by the flow of oxygen through the regulator, a time delay switch operable by the operation of said blinker switch to extinguish said signal, and a second switch operable by said aneroid at a lower predetermined pressure to operate said signal despite the operation of said time delay switch.

5. An oxygen requirement indicator for use with an oxygen regulator, comprising an aneroid subjected to the ambient pressure of an aircraft cabin, a dial, a pointer cooperating with said dial and driven by said aneroid to indicate cabin pressure, a switch operable by said aneroid when the cabin pressure reaches and falls below a predetermined pressure, a warning signal operable by said switch upon operation thereof, a blinker switch intermittently operable by the flow of oxygen through the regulator, and thermal switch means operative by the operation of said blinker switch to extinguish said signal, said thermal switch becoming inoperative upon failure of the blinker switch to permit operation of the signal by said first switch when the cabin pressure is below the predetermined pressure.

6. An oxygen requirement indicator for use with an oxygen regulator, comprising an aneroid subjected to the ambient pressure of an aircraft cabin, a dial, a pointer cooperating with said dial and driven by said aneroid to indicate cabin pressure, a switch operable by said aneroid when the cabin pressure reaches and falls below a predetermined pressure, a warning signal operable by said switch upon operation thereof, a blinker switch intermittently operable by the flow of oxygen through the regulator, thermal switch means operative by the operation of said blinker switch to extinguish said signal, said thermal switch becoming inoperative upon failure of the blinker switch to permit operation of the signal by said first switch when the cabin pressure is below the predetermined pressure, and a second switch operable by said aneroid at a lower predetermined pressure to operate said signal despite the operation of said blinker switch.

7. An oxygen requirement indicator for use with an oxygen regulator, comprising a pressure responsive member subjected to the ambient pressure of an aircraft cabin, a switch operable by said member when the cabin pressure reaches a predetermined value, a warning signal operable upon operation of said switch, a blinker switch intermittently operable by the flow of oxygen through the regulator to extinguish said signal, and a second switch operable at a lower predetermined pressure by said member to operate said warning signal despite the operation of said blinker switch.

8. An oxygen requirement indicator for use with an oxygen regulator, comprising an aneroid subjected to the ambient pressure of an aircraft cabin, a switch operable by said aneroid when the cabin pressure reaches and falls below a predetermined pressure, a warning signal operable by said switch upon operation thereof, a blinker switch intermittently operable by the flow of oxygen through the regulator, thermal switch means operative by the operation of said blinker switch to extinguish said signal, said thermal switch becoming inoperative upon failure of the blinker switch to permit operation of the signal by said first switch when the cabin pressure is below the predetermined pressure, and a second switch operable by said aneroid at a lower predetermined pressure to operate said signal despite the operation of said blinker switch.

9. An oxygen requirement indicator for use with an oxygen regulator, comprising a pressure responsive member subjected to the ambient pressure of an aircraft cabin, indicating means driven by said member to indicate the cabin pressure, a switch operable by said member when the cabin pressure reaches a predetermined value, a warning signal operable upon operation of said switch, and means associated with the oxygen regulator to extinguish said signal when oxygen flows through the regulator.

10. An oxygen requirement indicator for use with an oxygen regulator, comprising an aneroid subjected to the ambient pressure of an aircraft cabin, indicating means driven by said aneroid to show cabin pressure, a switch operable by said aneroid when the cabin pressure reaches a predetermined value, a warning signal operable upon operation of said switch, a blinker switch intermittently operable by the flow of oxygen through the regulator, and a time delay switch operable by the operation of said blinker switch to extinguish said signal.

NORMAN F. HOSFORD.

REFERENCES CITED

The following references are of record in the file of this patent:

UNITED STATES PATENTS

| Number | Name | Date |
| --- | --- | --- |
| 2,435,181 | Lindsay | Jan. 27, 1948 |